Patented May 4, 1926.

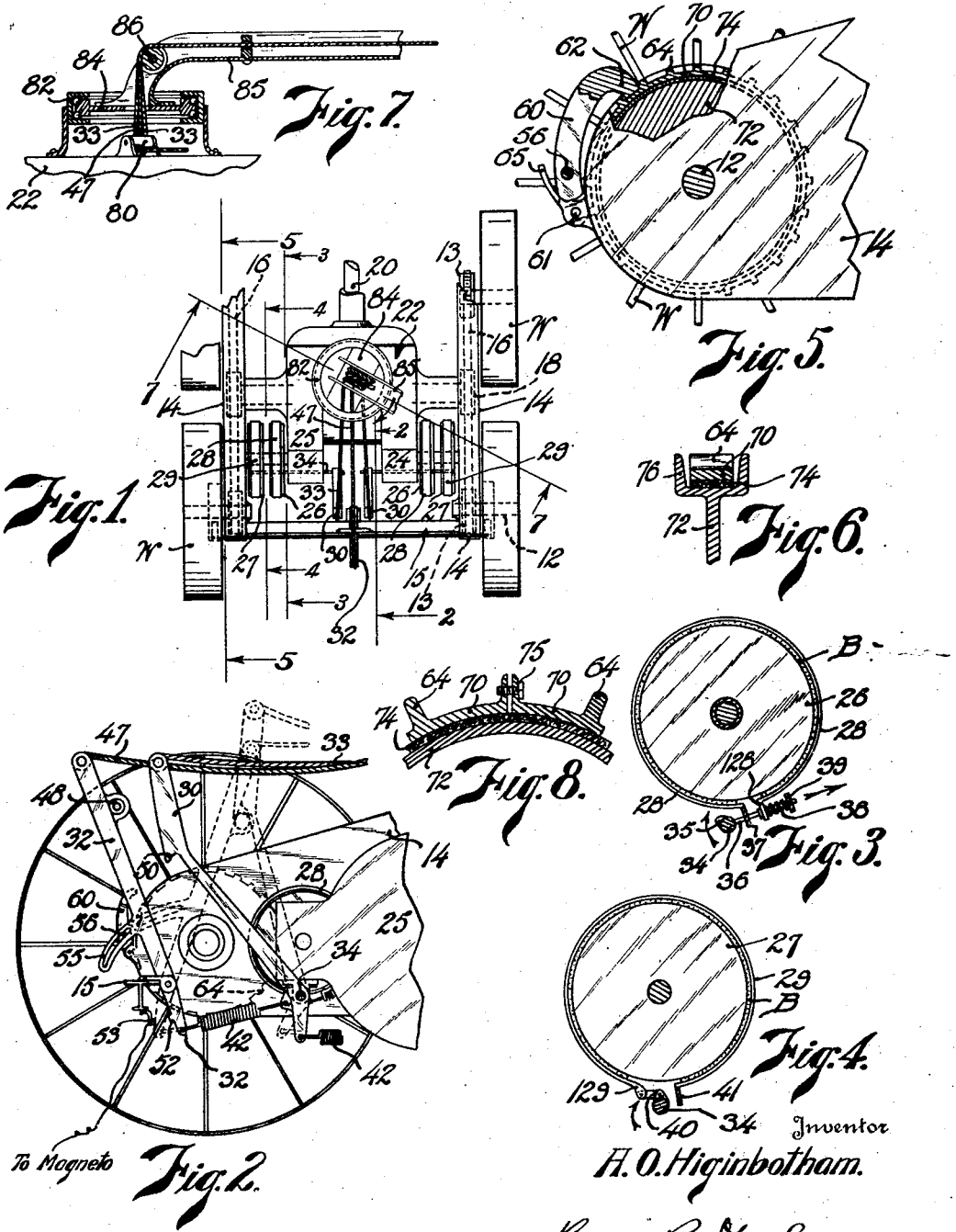

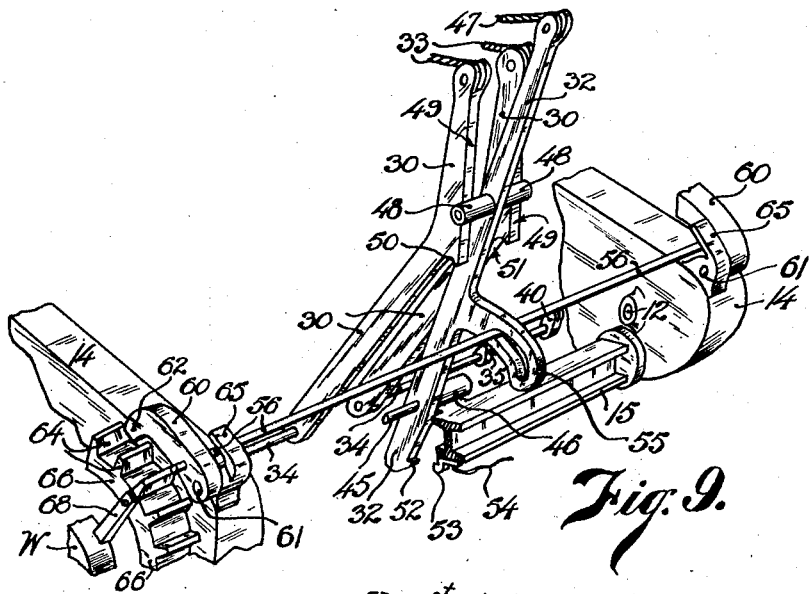

1,583,148

UNITED STATES PATENT OFFICE.

ARTHUR O. HIGINBOTHAM, OF DENVER, COLORADO.

TRACTOR AND MOVEMENT CONTROL THEREFOR.

Application filed January 9, 1922. Serial No. 527,919.

*To all whom it may concern:*

Be it known that I, ARTHUR O. HIGINBOTHAM, a citizen of the United States, and a resident of the city and county of Denver, State of Colorado, have invented certain new and useful Improvements in Tractors and Movement Control Therefor, of which the following is a description in such full, clear, and exact terms as will enable others skilled in the art to make and use the same, reference being had to the accompanying drawings, which form a part hereof.

The object of this invention is to provide a tractor having four driven wheels, which may if desired be turned on a circle whose diameter is the diagonal of the rectangle determined by the points of the wheel-treads which engage the ground. Another object is to control such a tractor entirely by means of lines of the flexible type which are carried back to an implement drawn by the tractor and upon which implement the operator may be seated.

Briefly, the invention comprises a four-wheel tractor having a double-unit planetary type of transmission, of which one unit drives the pair of wheels on one side and the other unit drives the opposite pair. The units are adapted to drive their wheels either forward or rearward. By driving one pair forward and the other rearward the tractor can be completely turned with the wheels running on a circle whose diameter is the diagonal of the rectangle determined by the ground-engaging points of the wheels. The specific type of transmission forms no part of the present invention, but the specific control therefor is a part of this invention. Each unit of the transmission comprises a pair of drums and brake bands are employed for the selective control of rotation of said drums. A control arm mounted upon a rock shaft is employed to operate the brake bands of each pair of drums, and a third arm is employed for locking the two control or rock-shaft arms in neutral position and also for grounding the magneto to stop the engine. The two control arms are urged toward forward position and normally there retained by springs or the like. By means of lines or the like these arms may be moved to an intermediate or neutral position and from there to reverse position. By so holding the arms that the drums slip more or less, only a portion of the power may be transmitted as desired, for either forward or reverse. The third or locking arm may be moved, as by a line, into engagement with the other arms so as to carry the latter automatically into neutral position where they are held until positively released, as by movement of the two control arms to permit disengagement of the locking arm. Further movement of the third arm grounds the ignition of the engine. The third arm also applies braking mechanism.

Certain embodiments of the present invention are disclosed in the accompanying drawings wherein—

Fig. 1 is a partial plan of a tractor embodying the novel features;

Fig. 2 is a fragmentary interior elevation taken from line 2—2 of Fig. 1;

Figs. 3 and 4 are sectional details of the transmission taken from lines 3—3 and 4—4 respectively of Fig. 1;

Fig. 5 is a detail on line 5—5 of Fig. 1 showing the brake mechanism;

Fig. 6 is a sectional detail thereof;

Fig. 7 is a section on line 7—7 of Fig. 1 showing the draw-bar and line mountings;

Fig. 8 is a sectional detail of the brake mechanism;

Fig. 9 is a perspective view showing the brake mechanism and control and locking levers; and Fig. 10 is a diagrammatic showing of the lever movements.

The four wheels W are mounted upon stub shafts 12 which are journaled in the side casings 14 and carry sprockets 13. Cross beams 15 or the like connect the casings 14 and make a solid structure. The wheels are driven by means of chains 16 running from drive sprockets 18 to the sprockets 13, sprockets 18 being carried on the ends of jack shafts (not shown) driven from an engine shaft 20 through the medium of a planetary transmission forming no part of this invention and carried within a housing 22. The transmission has two independent units operating in extensions 24 and 25 of the housing 22 for independent driving of the two pairs of wheels W. Each unit has a pair of rotary drums 26 and 27 and these drums are respectively provided with co-operating brake bands 28 and 29 provided with the usual brake linings B, whereby tightening of a band prevents rotation of the respective drum and produces movement of the respective wheels in a well known manner.

The operation of the brake bands 28 and 29 and consequent control of the drums 26 and 27 is had by means of a pair of control arms or levers 30, one being connected with each set of drums, and a third arm or lever 32 is employed to lock the arms 30 in neutral position. Each arm 30 is carried by and operates a rock shaft 34 which in turn is provided with means for operating the brake bands 28 and 29 of the respective pair of drums. As shown (Fig. 3), a cam 35 on each rock shaft 34 is adapted to engage the end of a rod 36 which is guided in a fixed lug 37 to which the band 28 is connected at one end, and in a fixed lug 39 between which and the other offset end 128 of the band a spring 38 is interposed for the purpose of normally tightening the band 28 on the drum 26. When shaft 34 is rocked cam 35 lifts rod 36, compresses spring 38 and releases band 28. This position may be the neutral position as indicated in dotted lines in Fig. 2 and also in Fig. 10, or it may be the reverse position indicated in Fig. 10. When shaft 34 is rocked back to normal position under the influence of spring 42, as indicated in full lines in Figs. 2, 9 and 10, spring 38 tightens band 28 and the respective wheels W are driven forward. For the purpose of controlling the reverse bands 29, shafts 34 operate links connected with the ends 129 of the respective bands 29 for tightening said bands, whose opposite ends are held at 41, so as to produce reverse rotation of the wheels W. However there is sufficient play at 40 so that said reverse bands 29 are not tightened initially or when the arms are in neutral position. All arms 30 and 32 are under the influence of springs 42 which urge them to the normal, forward-drive position indicated in full lines, the arms being moved by means of flexible lines or cables 33 and 47.

Lock arm 32 is pivoted by means of a short shaft 45 on bearings 46 carried by the beam 15, and is provided on opposite sides adjacent its upper end with rollers 48 adapted to engage and travel along cam faces 49 on the rearward edges of the arms 30. Thus when lock arm 32 is drawn forward by line 47, the rollers 48 force the control arms 30 forward and move them into neutral position. When this position is reached the rollers 48 drop under shoulders 50 on arms 30 and lock the latter in said position, the tension of the various springs permitting such locking.

Lock arm or lever 32 is also relied upon for shorting the magneto of the engine and preventing ignition. This is accomplished by means of a contact 52 on the lower end of the arm which is adapted to engage an insulated contact 53 mounted on beam 15 and connected with the magneto M. When lever 32 is in neutral position for locking the arms 30 the contacts 52 and 53 are slightly spaced, Fig. 10. Slightly further forward movement of the upper end of lever 32, which causes rollers 48 to travel downward along the faces 51 of arms 30 below shoulders 50 and move arms 30 further forward, produces engagement of said contacts and consequent grounding of the magneto.

When it is desired that lock lever 32 be withdrawn in order to release arms 30, it is merely necessary to draw said arms 30 slightly forward as by draft upon lines 33, so that shoulders 50 are disengaged from rollers 48 and lock lever 32 is returned to normal or rearward position by its spring 42. Arms 30 may then be manipulated as desired.

Lock lever 32 performs the additional function of applying a brake mechanism when it is moved to neutral position. This is accomplished by means of a rearwardly extending arm 55 which operates a transverse brake rod 56 received in a cam slot 57 in said arm 55. Said slot 57 may be arcuate as seen in Fig. 2, or it may have an offset lower portion 58 as seen in Figs. 9 and 10. In the form of Fig. 2, the rod 56 will be pulled or pushed by arm 55 when engaged at the ends of the slot. In the form of Figs. 9 and 10, when lever 32 moves forward the offset portion 58 will positively thrust the rod 56 forward and downward, while said slot portion 58 will as positively return the rod when lever 32 returns to normal driving position. Brake rod 56 operates a pair of dogs 60 carried on its ends, these dogs being pivoted at 61 to ears on the casing 14, and each having an offset finger 62 to engage between teeth 64 carried by the respective wheels W. Stationary guards 65 are provided adjacent each dog 60 to overhang the rod 56 at each end and limit the return of the respective end. This insures operation of both ends of the rod by the cam arm 55 when moved rearward so that both dogs 60 will be withdrawn from the teeth 64 to release wheels W.

The teeth 64 may be rigidly or somewhat yieldingly carried by the wheels. In Fig. 9 they are shown as being integral with a drum or ring 66 secured to the spokes 68 of the wheel W. With this construction the wheels will be locked immediately upon movement of lock lever 32 to neutral position. Again, the teeth 64 may be carried by a band 70 which is mounted upon a drum 72 or the like, brake lining 74 being interposed. For convenience of mounting, the band 70 is preferably two-piece and secured as at 75. With this form there will be sufficient initial slippage between the parts to take up the shock, whereas in the other form excess shock will be absorbed by slipping of the wheels on the ground. The drum 72 may be conveniently channeled to present side walls 76 for retaining the band 70 and the lining 74.

The lines 33 and 47 extend forward from the bars 30 and lever 32 to and around a roller or rollers 80 centrally disposed with respect to a circular track 82 for a turntable 84 which supports a channel shape draw-bar 85 adapted to extend rearward for attachment of an implement. Directly above the roller 80 a roller or rollers 86 are mounted on the draw-bar, to which the lines extend upward and whence they extend rearward along the channel of the draw-bar. In this manner, as the draw-bar is swung on the track 82 that portion of the line between the two rollers remains at the center of rotation of the turntable and no longitudinal movement of the line is produced. Thus the lines may be manipulated without extension or shortening or other interference regardless of the angle of the draw-bar, which as shown is connected at about the center of the tractor.

In operating the tractor, the parts will be in the full line positions shown for forward movement, in which case the bands 28 will be tightened upon the drums 26. By pulling upon the right line, for instance, so as to move the right arm 30 a short way and allow the respective band 28 to slip a little, the right wheels will move a little slower and the tractor will turn to the right on a long curve. By pulling the right line 33 into neutral position, the turn to the right will be more sharp. By pulling said right line into reverse, the right wheels will reverse and the turn to the right will be very short, and when in full reverse position the right wheels will travel backward at the same speed that the left wheels travel forward so that the turn to the right will be on a circle whose diameter is the diagonal of the rectangle determined by the ground-contacting points of the wheels, as heretofore pointed out. Thus it will be seen that when one arm 30 is set in position for a different speed or direction from that of the other arm 30, steering to one side or the other will take place.

When the middle line 47 is pulled the lock lever 32 is pulled into neutral position and the arms 30 are carried with it, this position being maintained by engagement of the rollers 48 on lever 32 under the shoulders 50 of the arms 30 through the influence of springs 42 of arms 30. Draft upon both the lines 33 will move the arms 30 against their springs and withdraw shoulders 50 from the rollers 48, whereupon the spring of lever 32 will return said lever to the driving or full line position of Fig. 10. Since lever 32 locks the parts in neutral position it serves as a safety device. At the same time the arm 55 on said lever 32 throws the dogs 60 into engagement with the wheels thereby braking said wheels. Slight further movement of lever 32 when in neutral position grounds the magneto through the contacts 52 and 53 and stops the engine. This additional movement, however, is not sufficient to carry the arms beyond the limits of neutral position as will be seen from Fig. 10, and the rod 56 will yield sufficiently under the strain of cam arm 55 to permit the additional movement.

Thus it will be evident, that draft upon either or both of the lines 33 and release of either or both thereof as desired, controls all forward, reverse and steering movements, and that draft upon the line 47 results in releasing the power and braking the tractor, as well as finally stopping the engine itself. In this connection, it also will be seen that the lever 32 under influence of its spring 42 withdraws the brakes automatically when arms 30 are drawn forward by lines 33 to release rollers 48 from the shoulders 50.

A valuable feature is found in the brake rod 56 which has sufficient resilience to enable it to yield somewhat under influence of the lever 32 and its cam arm 55 when the latter are moved. As above indicated this is necessary to permit that additional amount of movement of lever 32, after the brakes have been set, required to ground the magneto. However, the rod 56 is sufficiently stiff that a considerable amount of extra force is required to move said lever to magneto-grounding position after having reached brake-applying position. Thus, there is little or no possibility of grounding the magneto and stopping the engine unintentionally when it is desired merely to move the arms 30 to neutral position, apply the brakes and leave the engine running.

A further function of the resilience of rod 56 is to permit the lever to be moved entirely to neutral position even though the fingers 62 of the dogs 60 should not enter between the teeth 64 but should strike upon the tops of the teeth. In this event the dogs would be under tension and would be forced down between the teeth upon slight further rotation of the wheels. The same would apply if only one dog should strike the top of a tooth. Again, if the fingers 62 of the dogs are jammed against the teeth when the brakes are set, the rod 56 will give under influence of cam arm 55 and be thereby placed under tension so that the dogs will be withdrawn by reason of said tension of the rod when the wheels are moved to release the fingers 62, the lever 32 and arm 55 having been returned to driving position.

I claim:

1. A tractor having a power-transmission, an arm connected with said transmission and movable into forward, neutral and reverse positions, and a member adapted to move said arm into neutral position and there retain the same, said member being releasable from the arm by further movement of the arm.

2. A tractor having a power-transmission, an arm connected therewith and movable into forward, neutral and reverse positions, said arm having a shoulder thereon and being spring controlled, and a member adapted to move said arm into neutral position and engage under said shoulder to retain the arm in neutral position.

3. A tractor having a power-transmission, an arm connected therewith and movable into forward, neutral and reverse positions, said arm having a shoulder thereon, and a member adapted to be moved into engagement with said arm for moving the arm into neutral position and adapted to engage under said shoulder to retain the arm in said neutral position.

4. A tractor having wheels and a power-transmission, an arm connected with said transmission and movable into forward, neutral and reverse positions, a member adapted to move said arm into neutral position, and means connected with said member for braking said wheels when the member is moved.

5. A tractor having wheels and a power-transmission, an arm connected with said transmission and movable into forward, neutral and reverse positions, a member adapted to move said arm into neutral position, a brake device carried by certain of said wheels, and a braking element connected with and operable by said member for movement into engagement with said brake device.

6. A tractor having wheels and a power-transmission, an arm connected with said transmission and movable from forward into neutral position, a member adapted to move said arm into neutral position, a brake device carried by certain of said wheels, a dog adapted to engage said device for braking purposes, and a connection between said dog and said member whereby said dog is moved to braking position when said member moves said arm into neutral position.

7. A tractor having a power-transmission and a magneto, an arm connected with said transmission and movable from forward to neutral position, a member adapted to move said arm into neutral position, an insulated contact, and a contact adapted to be engaged with said insulated contact when said member is moved into neutral position, whereby said magneto is grounded, said insulated contact being connected with said magneto.

8. A tractor having ground wheels, braking mechanism therefor, and a magneto, a single member for applying said braking mechanism to said wheels and grounding said magneto, and means for operating said member.

9. A tractor having ground wheels, braking mechanism therefor, a power-transmission, and a magneto, and a single movable member for applying said braking mechanism, placing said transmission in neutral and grounding said magneto.

10. A tractor having ground wheels, braking mechanism therefor, a power transmission, and a magneto, a single movable member for applying said braking mechanism, placing said transmission in neutral and grounding said magneto, and means to move said member and produce said results in one operation.

11. A tractor having ground wheels, braking mechanism, a power-transmission and a magneto, and movable means for applying said braking mechanism, placing said transmission in neutral and grounding said magneto in one operation.

12. A tractor having ground wheels, braking mechanism, and a power transmission, a member for placing said transmission in neutral and driving positions, and an element for moving said member into neutral position and applying said braking mechanism in a single operation, a single flexible line for operating said member, and a single flexible line for operating said element.

13. A tractor having ground wheels, braking mechanism, and a power transmission having two units, a pair of members for placing said transmission in neutral and driving positions, an element for moving said members into neutral position and applying said brake in one operation, a flexible line connected to each of said members and a third flexible line connected to said element, all of said lines extending outward from the tractor.

14. A tractor having ground wheels, a brake therefor, and a power transmission having two units, a pair of arms for placing said units in neutral and driving positions, a magneto, a member for moving said arms into neutral position, applying said brake and grounding said magneto in one operation, a flexible line connected with each of said arms and a third single flexible line connected with said member, all of said lines extending outward from the tractor whereby said arms and member may be operated from a station at a distance from the tractor.

15. A tractor having a ground wheel, a toothed rack movably and frictionally mounted on said wheel to have a limited amount of slippage thereon, a dog adapted to engage said rack to brake the wheel, and means to operate the dog.

16. A tractor having a ground wheel, a toothed member mounted thereon, a dog adapted to engage said member to brake the wheel, a lever for operation of the dog, and a yielding connection between the lever and the dog for placing the latter under tension by movement of the lever.

17. A tractor having a ground wheel, a toothed member thereon, a dog adapted to engage said member for braking the wheel, a lever, and a resilient rod connecting the lever with the dog whereby the dog may be placed under tension upon movement of the lever.

18. A tractor having a ground wheel, a braking device therefor, a dog adapted to engage said device for braking the wheel, a lever, a resilient rod connecting the lever with the dog whereby the dog may be placed under tension when the lever is moved, and a flexible line connected with the lever and leading from the tractor for operation of the brake at a distance from the tractor.

19. A tractor having a ground wheel, braking means therefor, a resilient rod connected with said means to operate the same, a lever having a cam for operation of the rod, whereby said means may be operated by initial movement of the lever and placed under tension of the rod by additional movement of the lever.

20. A tractor having an engine, means controlling the engine, a power transmission, and a single member movable to place said transmission in neutral and further movable to act upon said engine control and stop the engine.

21. A tractor having an engine, a control for the engine, a power transmission, ground wheels, braking mechanism for said wheels, and a single movable member for placing said transmission in neutral and applying said braking mechanism upon initial movement and for acting upon said engine control to stop the engine upon further movement.

22. A tractor having an engine, a control for the engine, a power transmission, ground wheels, braking mechanism therefor, said power transmission having two units, a member for placing each unit in neutral and in driving positions, and a movable part for engaging said members to move them into neutral position and applying said braking mechanism, and upon further movement for acting upon said engine control to stop the engine.

23. A tractor having an engine, ignition means therefor, a power transmission, ground wheels, braking mechanism therefor, and a single member movable initially for placing said transmission in neutral and applying the braking mechanism and movable further to act upon said ignition means and cut off the ignition to stop the engine.

24. A tractor having a brake, a movable member for applying and releasing the brake, means for moving said member to apply the brake, a power transmission unit, a single control means to place the transmission unit in neutral, forward and reverse positions, and means for automatically returning said member to release the brake when said control means is operated to shift the transmission into position for driving the tractor either forward or backward.

25. A tractor having a brake, a movable member for applying and releasing the brake, means for moving said member to apply the brake, a power transmission having a pair of units, control means for said units, and means for automatically returning said member to release said brake only when said control means is shifted to place both of said units in forward driving position.

26. A tractor having a brake, a movable member for applying and releasing the brake, means for moving said member to apply the brake, a power transmission, control mechanism for placing said transmission in neutral and forward positions and adapted to lock said member in brake-applying position, and means for automatically returning said member to release said brake when said mechanism is operated for shifting said transmission into position for driving the tractor forward.

27. A tractor having a brake, a power transmission, a control arm therefor for placing the same in neutral and driving positions, a movable member for moving said arm to neutral position and applying said brake in the same operation and for releasing said brake, said arm being further movable, and means for automatically returning said member from brake applying position to release the brake upon said further movement of the arm.

28. A tractor having a brake, a power transmission, a control arm adapted to place the transmission in neutral and driving positions, and a member adapted to apply said brake and move said arm into neutral position and to release said brake, said member being adapted to retain said arm in neutral position and to be retained thereby in such position, said arm having further movement and being adapted to release said member upon said further movement.

29. A tractor having a brake, a power transmission, a control arm adapted to place the transmission in neutral and driving positions, a member adapted to apply said brake and move said arm into and retain it in neutral position and to release said brake, said member being retained in neutral position by said arm, said arm having further movement and being adapted to release said member upon such further movement, and means for automatically returning said member to release said brake when said member is released by said arm.

30. A tractor having a power transmission, a control arm for placing said transmission in neutral and driving positions, a member adapted to move said arm into neutral position and there retain the same and be thereby retained, said arm having further movement for release of said member, and means for automatically returning said member when released by said arm.

31. A tractor having a power transmission, a control arm for placing said transmission in neutral and driving positions, and a member adapted to engage and move said arm into neutral position, to lock said arm in neutral position and to be held by said arm in such position, said arm having further movement and adapted to release said member upon such further movement.

32. A tractor having ground wheels, a power transmission, control means for placing said transmission in neutral and driving positions, a member adapted to retain said means in neutral position and at the same time lock said ground wheels, and means for automatically unlocking said wheels upon operation of said control means only.

33. A tractor having ground wheels, a power transmission, control means for placing said transmission in neutral and driving positions, a member movable to carry said means into neutral position and there retain the same and simultaneously to lock said ground wheels, said control means having further movement, and means for automatically unlocking said wheels upon operation of said control means only for said further movement.

34. A tractor having a power transmission, control means for placing said transmission in neutral and driving positions, a member adapted to move said means into neutral position and there retain the same, said control means having further movement, and means for automatically returning said member upon operation of said control means only.

In testimony whereof, I affix my signature.

ARTHUR O. HIGINBOTHAM.